United States Patent [19]

Shiraki

[11] Patent Number: 5,038,062
[45] Date of Patent: Aug. 6, 1991

[54] SWING-ARM TYPE LINEAR D.C. BRUSHLESS MOTOR

[75] Inventor: Manabu Shiraki, Yamato, Japan

[73] Assignee: Shicoh Engineering Co., Ltd., Tokyo, Japan

[21] Appl. No.: 420,486

[22] Filed: Oct. 12, 1989

[51] Int. Cl.⁵ .............................................. H02K 33/12
[52] U.S. Cl. ......................................... 310/39; 310/36
[58] Field of Search ..................... 310/36, 38, 156, 39; 335/229, 272; 360/75, 78, 13

[56] References Cited

U.S. PATENT DOCUMENTS

| 4,620,252 | 10/1986 | Bauck et al. | 360/106 |
| 4,945,330 | 7/1990 | Arita | 335/229 |

Primary Examiner—William H. Beha, Jr.
Assistant Examiner—Judson H. Jones
Attorney, Agent, or Firm—Finnegan, Henderson, Farabow, Garrett & Dunner

[57] ABSTRACT

Disclosed herein is a swing-arm type linear d.c. brushless motor, wherein at least one coreless type armature coil such as an air-core armature coil is arranged on the inner wall of a linear motor body and a field magnet is formed by magnetizing a magnet member with a single pair of N/S poles so as to permit the generation of thrust in a predetermined direction face to face with only one active conductor of said at least one armature coil and which does not contribute to the generation of reverse thrust. The field magnet is opposite through an air-gap in the axial direction to only the active conductor portion, and is supported relatively and swingably through the air-gap. It is suitable for use in small, economical and high-speed magnetic head positioner mechanisms more useful in small-capacity magnetic disk units and the like and capable of performing position detecting, feed control, etc.

9 Claims, 4 Drawing Sheets

SWING-ARM TYPE LINEAR D.C. BRUSHLESS MOTOR

BACKGROUND OF THE INVENTION

1. Field of the Invention

This invention relates to a swing-arm type linear d.c. brushless motor (hereinafter called "swing-arm type linear motor") suitable for use in a rotating magnetic positioner mechanism, which is useful for feeding a magnetic head of a magnetic disk unit having a relatively small capacity, or the like.

2 Description of the Related Art

A demand for high-density recording of information has resulted in frequent use of magnetic disk units. These magnetic disk units use a magnetic head for conducting read and write transfer of information from and into a disk are equipped with a magnetic head positioner mechanism for moving the magnetic head to a predetermined position.

Magnetic head positioner mechanisms include both linear and rotating types. The former is suitable for use in large-capacity magnetic disks, and the latter is suitable for use in a small-and medium-capacity magnetic disks.

A recent demand for small and/or portable units has resulted in a need for smaller, lower capacity and economical magnetic disk units. Also, magnetic head positioner mechanisms suitable therefor have been required.

In conventional magnetic head positioner mechanisms, the following means are used to permit the control of the feed ratio and position of a magnetic head. One of plural magnetic disks is sacrificed to contain positional information (such a magnetic disk is so-called a "positional information disk") so as to control the feed ratio and position of the magnetic head by information detected by the magnetic head and feeding it back to a control system.

However, the recent demand for small and/or portable units, has been met by small-size, small-capacity and economical magnetic disk units such as those using only one magnetic disk and those having no positional information disk even when plural magnetic disks have been used.

Here, since a magnetic disk unit having no postional information disk can not detect the feed ratio and position of its magnetic head, it must be provided with some other means for this purpose.

For such a detecting means, it has been known to use a linear potentiometer from which linear electric signals are output. However, it requires an A/D converter and hence has drawbacks in that it becomes complicated, large, and is costly.

Although there is a method arranging encoder as another method, it is necessary to use a highly precise, large-size and expensive encorder in order to detect the microfeed and position of the magnetic head. It is hence difficult to provide a small-size, small-capacity and economical magnetic disk unit.

SUMMARY OF THE INVENTION

An object of this invention is to provide a small-size and economical swing-arm type lines motor suitable for use in a small, economical and high-speed magnetic head positioner mechanism more useful in small-capactiy megnetic disk units and the like and capable of performing position detecting, feed control and so forth.

Another object of this invention is to provide a small-size and economical swing-arm type linear motor having a high-speed linear magnetic encoder capable of effecting position detecting, feed control, etc. with extreme ease and high precision in a magnetic disk unit making use of as few as only one magnetic disk, for example, a small-capacity magnetic disk unit making of no positional information disk.

The principal of this invention is accomplished by providing a swing-arm type linear motor comprising at least one coreless type armature coil such as an air-core type armature coil arranged on the inner wall of a linear motor body; and a single magnetic pole type field magnet formed by magnetizing a magnet member with a single pair of N/S poles as to permit the generation of thrust in a predetermined direction with only one active conductor portion, which does not contribute to the generation of reverse thrust, of said at least one armature coil, said field magnet opposite through an air-gap in the axial direction to said one active conductor portion, and being supported swingably through the air-gap.

Other objects of this invention are attained by the following means: (1) said at least one armature coil is formed as two air core type coils arranged adjacently so as not to overlap each in a position opposite to the field magnet, thereby obtaining required thrust only by adjacent active conductor portions, which do not contribute to the generation of reverse thrust, of the two armature coils, and the width of the magnetic pole of the field magnet is defined more narrowly than that between both conductor portions positioned on the outer sides of the two armature coils; (2) the field magnet is formed so as to have almost the same width as that of the armature coil; (3the field magnet is formed by magnetizing a portion of a flat magnet member swingably supported with one pair of N/S poles, said portions of the magnet member facing one available conductor portion not contributing to the generation of reverse thrust; (4) the magnet member having the field magnet is joined with a rotating shaft supported swingably at a position on which the magnetic pole forming the field magnet is not magnetized; (5) the portion, which is not magnetized with the field magnet, of the magnet member is extended to form integrally a magentic head attaching part projecting from the swing-arm type linear motor body; (6) a plurality of fine-pitch magnetic poles are formed on the predetermined positions of the magnet member forming the field magnet in such a manner that circumferentially-adjacent magnetic poles are different in pole from another, so as to form linear magnetic encoder magnetic poles and a magnetic sensor adapted to obtain magnetic encoder signals of at least A phase and B phase is arranged at a fixed position facing the linear magnetic encoder magnetic poles through a space, whereby a linear magnetic encoder is composed with the linear magnetic encoder magnetic poles and the magnetic sensor; (7) the linear magnetic encoder magnetic poles are formed on a surface, which does not face the armature coil, of the magnet member; and (8) the linear magnetic encoder magnetic poles are formed on a surface, which is on the same plane as that facing the armature coil, but does not form the field magnet, of the magnet member.

The above and other objects features and advantages of the present invention will become apparent from the following description and appended claims, taken in conjunction with the accompanying drawings.

DETAILED DESCRIPTION OF THE INVENTION AND PREFERRED EMBODIMENTS

In the following embodiments, swing-arm type linear motors having a linear magnetic encoder formed therein will be described. If it is not desired to use the linear magnetic encoder, it is only necessary to form no linear encoder magnetic pole constituting the linear magnetic encoder on a magnet member.

First Embodiment of the Invention

Figure 1:
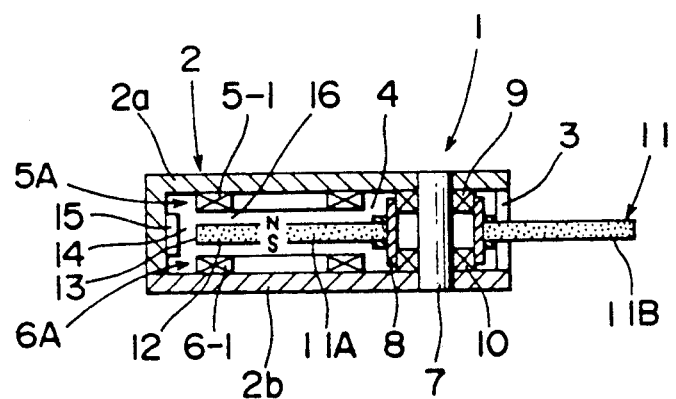
FIG. 1 is a vertical cross-sectional side view of a swing-arm type linear motor having a linear magnetic encoder according to the first embodiemnt of this invention.
Figure 3:
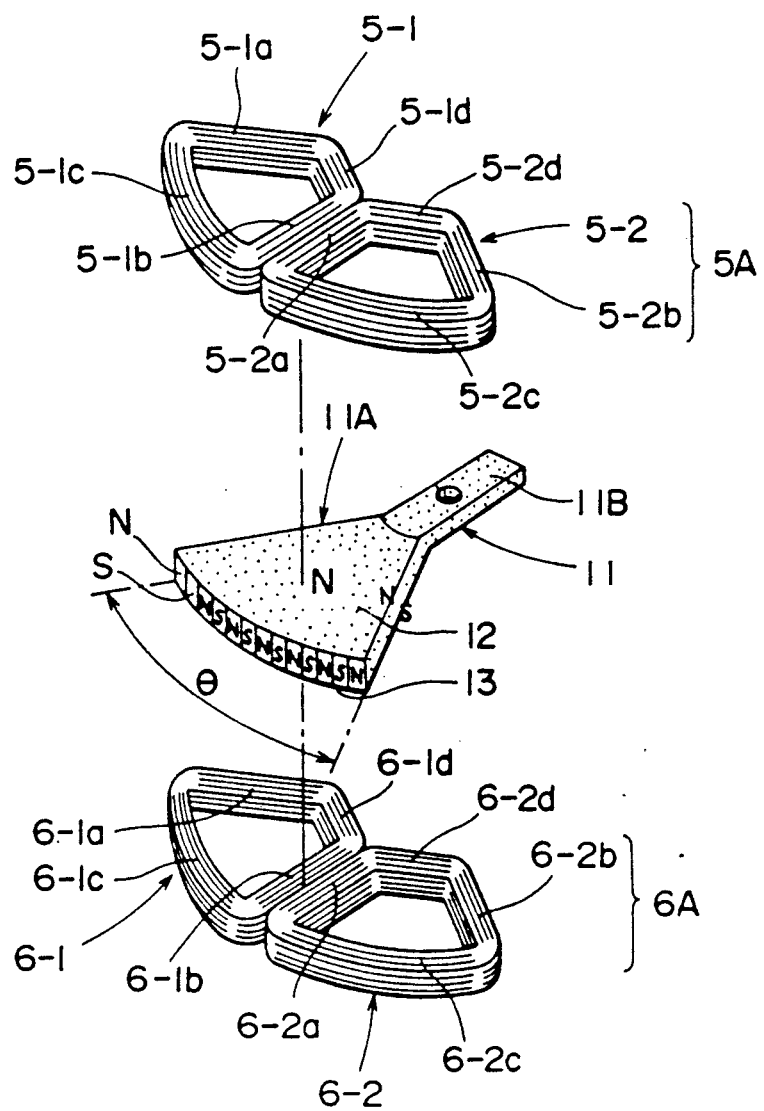
FIGS. 2 and 3 are exploded perspective views illustrating the facing relation between armature coils and a field magnet and shapes thereof and the position of linear magnetic encoder magnetic poles as to the swing-arm type linear motor shown in FIG. 1.
Figure 2:
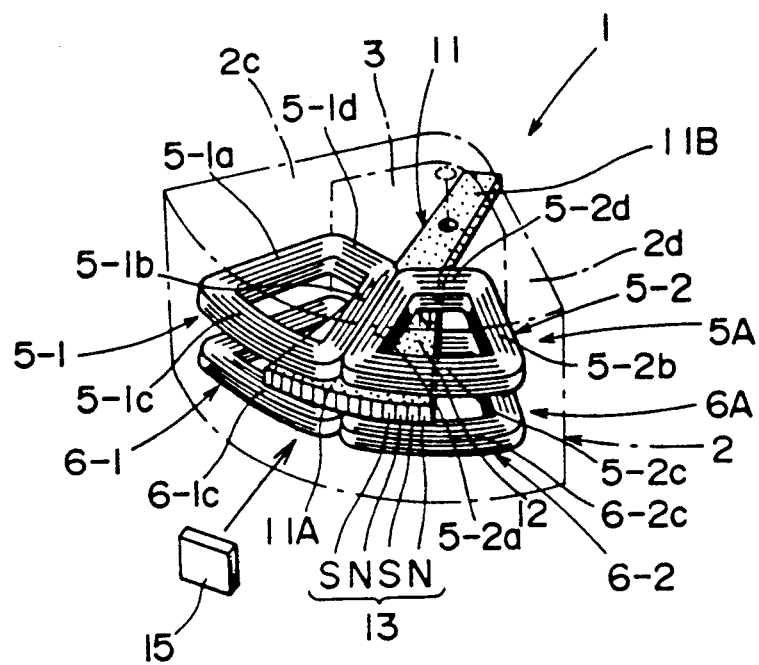
Figure 4:
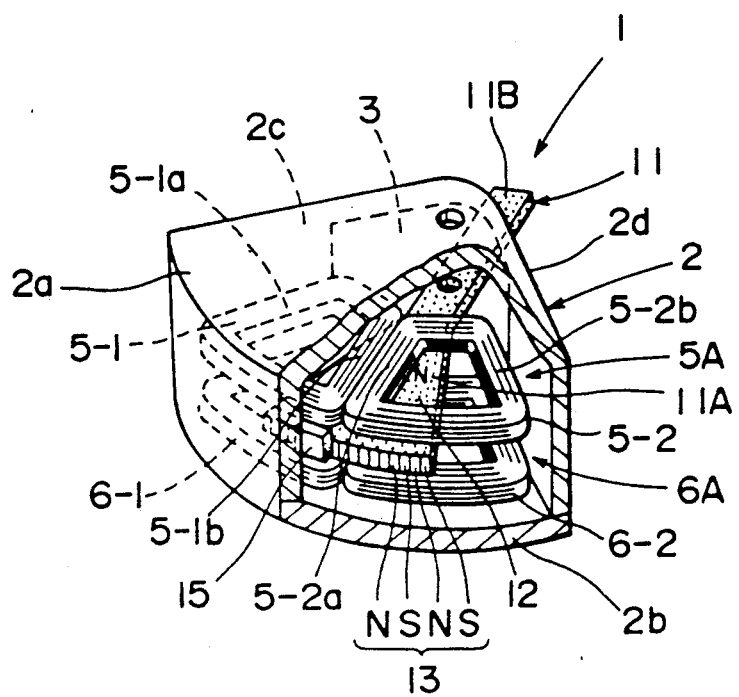
FIG. 4 is a partially cutaway perspective view of the swing-arm type linear motor shown in FIG. 1.

FIG. 1 illustrates a vertical cross-sectional side view of a swing-arm type linear motor 1 having a linear magnetic encoder according to the first embodiment of this invention. FIGS. 2 and 3 are explanatory illustrations illustrating the facing relation between armature 5-1, 5-2, 6-1, 6-2 and a field magnet 12 and the shapes thereof applicable to the swing-arm type linear motor 1 shown in FIG. 1. FIG. 4 is a partially cutaway perspective view of the swing-arm type linear motor 1 shown in FIG. 1. The swing-arm type linear motor 1 according to the first embodiment of this invention will hereinafter be described by reference to FIGS. 1 to 4.

A body 2 of the swing-arm type linear motor 1 having a linear magnetic encoder is formed in the shape of an elongated and squared C in vertical section and in the shape of a fan in plan by elements 2a and 2b composed of a magnetic material. Sidewalls 2c and 2d are formed on both sides of the element 2a and an opening 3 is defined betweeen both sidewalls 2c and 2d.

As illustrated in FIGS. 2 through 4, two sets of each two adjacent air-core type armature coils 5-1 and 5-2 as wall as 6-1 and 6-2 formed in the shape of a flat sectorial frame are arranged respectively on the lower side and the upper side of the elements 2a and 2b facing an inner space 4 of the body 2 of the swing-arm type linear motor 1. A first stator armature 5A is composed by the armature coils 5-1, 5-2, while a second stator armature 6A is composed by the armature coils 6-1, 6-2. A field magnet 12, which will be described subsequently, is swung realtively and reciprocally in an air-gap 16 between the stator armatures 5A and 6A. Namely, this embodiment indicates a linear d.c. brushless motor of a double-side exciting structure.

In these armature coils 5-1, 5-2, 6-1, 6-2, respectively one active conductor portion 5-1b, 5-2a, 6-1b, 6-2a extending radially from a fixing a shaft 7 as center, which will be described subsequently, and generates no reverse thrust but contribute to the genration of thrust in desired directions.

Conductor portions 5-1c, 5-1d, 5-2c, 5-2 d, 6-1c, 6-1d, 6-2c, 6-2d, oriented in the circumferentail direction, do not contribute to the generation of thrust and are thus inactive.

Other active conductor portions 5-1a, 5-2b, 6-1a, 6-2b contribute to the generation of reverse thrust and serve as conductor portions contributing to the generation of thrust, in themselves, when they face the field magnet 12. However, they are not used for the generation of thrust in this invention. This is due to the fact that when the conductor portions 5-1a, 5-2b, 6-1a, 6-2b face the field magnet 12, the thrust produces thereby acts as reverse thrust against the thrust produced by the active conductor portions 5-1b, 5-2a, 6-1b, armature coils 5-1, 5-2, 6-1, 6-2.

Therefore, the field magnet 12 is caused to face only the active conductor portions 5-1b, 5-2a, 6-1b, 6-2a of the armature coils 5-1, 5-2, 6-1, 6-2 so as to generate required thrust, thereby avoiding the generation of the reverse thrust by the conductor portions 5-1a, 5-2b, 6-1a, 6-2b. For this reason the conductor portions 5-1a, 5-2b, 6-1a, 6-2b are redundant. However, since the armature coils 5-1, 5-2, 6-1, 6-2 in such a shape can be formed more economically and easily than those of any other shapes, and the armature coils 5-1, 5-2, 6-1, 6-2 can be formed at a low cost compared with a magnet member 11 as described below, the flat magnet member 11, composed of a material as described below, the armature coils 5-1, 5-2, 6-1, 6-2 are used as a swinger and stators, respectively, in this invention.

A cylindrical rotating shaft 8 around the above fixing shaft 7 is swingably, supported by means of bearings 9, 10 provided respectively in both upper and lower ends of the inner periphery of the rotating shaft 8. To the rotating shaft 8, the magnet member 11 is fixed at a below described portion not magnetized with the field magnet 12. Almost the half of the magnet member 11, which is defined by the rotating shaft 8 as a boundary and is facing the above-described stator armatures 5A, 6A, is formed as a sectorial part 11A so as to form the field magnet 12. The remaining portion of the magnet member 11 is formed as a magnetic head guiding member 11B in the shape of an elongated plate, which is adapted to attach a magnetic head for reading and writing the information of magnetic disks in a magnetic disk unit (not illustrated) on its front end. The rotating shaft 8, which serves as a support, swingably supports the magnet member 11 in such a manner that the outer portions of both sectorial part 11A and magnetic head guiding member 11B move along arc-shaped tracks having the rotating shaft 8 as a center.

The sectorial part 11A of the magnet member 11 is magnetized with N and S poles on its upper and lower surface, respectively, to form the field magnet 12 having a single pair of poles. Of course, such magnetization may be turned the other way. The reason why the field magnet 12 is not formed into two or more alternating N and S magnetic poles adjacent to each other on one plane is that if a magnet material almost equal in size to the sectorial part 11A, which acts as a swinger, is magnetized with two or more alternating poles, the swing stroke of the field magnet 12 as the swinger can not be made long. When a field magnet is formed into two or more alternating magnetic poles, a sectorial part forming the field magnet must be made larger, resulting in a drawback that responsiveness to field flux becomes poor.

The field magnet 12 (sectorial part 11A) in the present embodiment is formed so as to have an opening angle smaller than the angle between both outer sides of the active conductor portions 5-1a or 6-1a of the armature coil 5-1 or 6-1 and the active conductor portion 5-2b or 6-2b of the armature coil 5-2 or 6-2. Therefore, field magnet 12 may not be forced substantially with reverse thrust generated by the conductor portions 5-1a, 5-2b, 6-1a, 6-2b, of the armature coils 5-1, 5-2, 6-1, 6-2. Namely, while reciprocally swinging, the field magnet 12 faces either the active conductor portions 5-1b and 6-1b or 5-2a and 6-2a of the armature coils 5-1, 5-2, 6-1, 6-2 get thrust without fail. The armature coils 5-1 and 6-1 as well as 5-2 and 6-2 are electrically connected so as to successfully generate thrust in the same direction without fail by the active conductor portions 5-1b and 6-1b or 5-2a and 6-2a of the armature coils 5-1 and 6-1 or 5-2 and 6-2 when electric current is caused to flow therein.

A plurality of fine-pitch alternating N and S magnetic poles are magnetized on the peripheral surface of the sectorial part 11A, which is perpendicular to the plane forming the field amount magnet 12 of the magnet member 11, in such a manner that adjacent magnetic poles are different in pole from each other along the circumferential direction and each magnetic pole is oriented in radial direction, so as to form linear magnetic encoder poles 13. A magnetic sensor capable of detecting magnetic encoder signals of A phase and B phase, for example, a magnetroresistance element (MR sensor) 15, is arranged on an inner sidewall of the element 2a, which is opposite to the linear magnetic encoder magnetic poles 13 through a space 14.

A linear magnetic encoder is composed with the linear magnetic encoder magnetic poles 13 and the magnetroresistance element 15.

The output from the magnetroresistance element 15 is transmitted to a control circuit system through a lead wire not illustrated.

Therefore, when the stator armatures 5A and 6A are energized and controlled by signals from the control circuit system, the field magnet 12 gets thrust in a predetermined direction and magnitude and hence swings in a predetermined direction and to a predetermined position, whereby a magnetic head (not illustrated) attached to the other half portion of the magnetic member 11, i.e. , the magnetic head guiding member 11B is swung to a prescribed position. By the swing of the field magnet 12, the linear magnetic encoder magnetic poles 13 are swung relatively to the magnetroresistance element 15. Accordingly, magnetic encoder signals detected by the magnetroresistance element 15 allow the field magnet 15 to make the controlled movement in the predetermined direction through a closed loop, thereby successfully swing the magnetic head under control to a position in a predetermined direction at a prescribed rate.

It may be noted that in the case of above-described linear magnetic encoder, even when the magnetizing precision of the linear magnetic encoder magnetic poles 13 is relatively rough, no problem will be caused by making use of a means for electrically improving its resolution which have been devised variously.

Second Embodiment of the Invention

Figure 5:
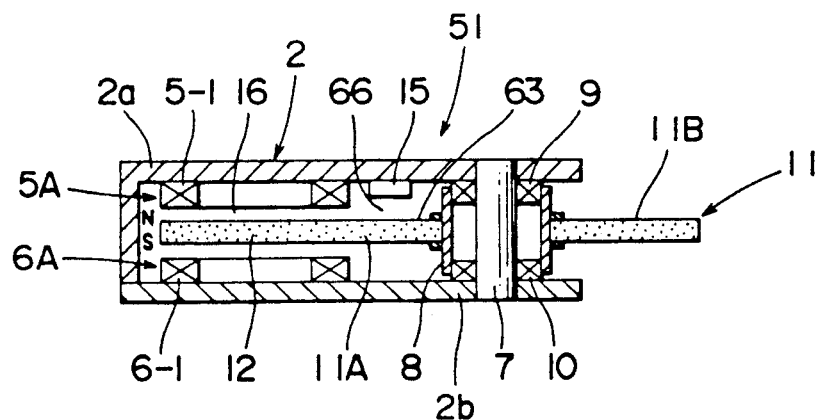
FIG. 5 is a vertical cross-sectional side view of a swing-arm type linear having a linear magnetic encoder according to the second of this invention.
Figure 7:
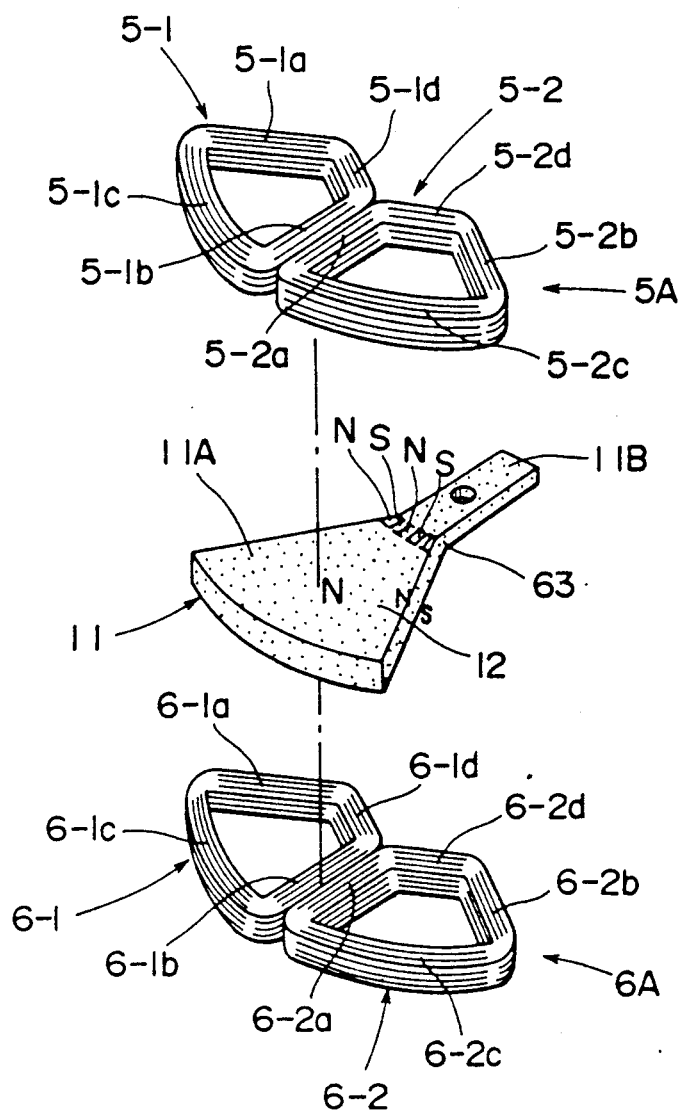
FIGS. 6 and 7 are exploded perspective views illustrating the facing relation between armature coils and a field magnet and shapes thereof and the position of linear magnetic encoder magnetic poles as to the swing-arm typw linear shown in FIG. 5.
Figure 6:
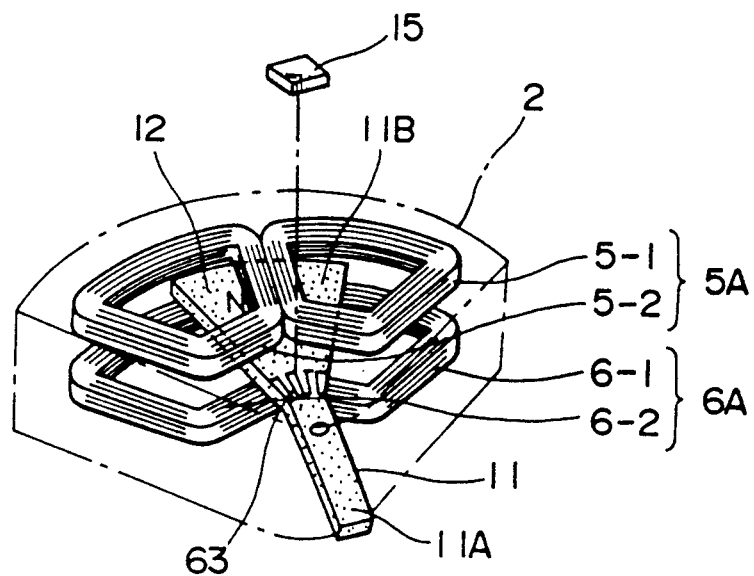
Figure 8:
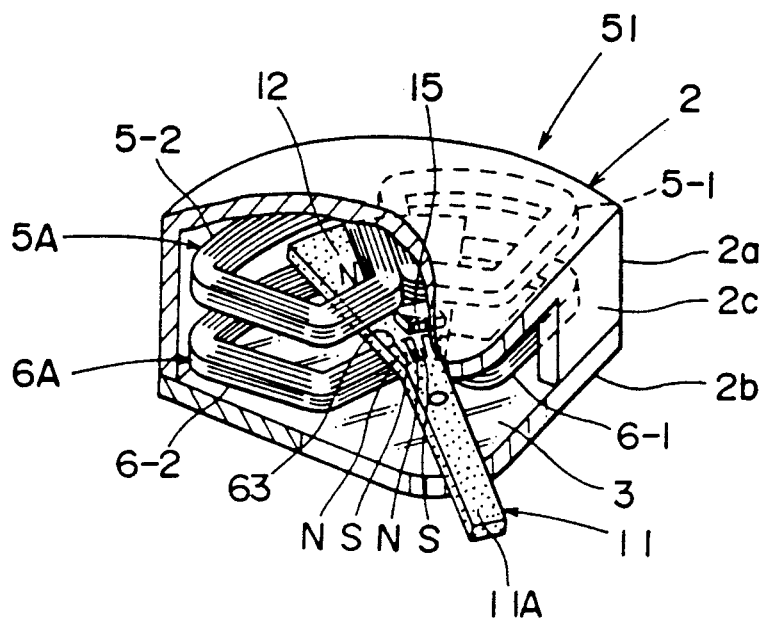
FIG. 8 is a partially cutaway perspective view of the swing-arm linear motor shown in FIG. 5.

FIG. 5 is a vertical cross-sectional side view of a swing-arm type linear motor 51 having a linear magnetic encoder according to the second embodiment of this invention. FIGS. 6 and 7 are explanatory illustrations illustrating the facing relation between armature coils 5-1, 5-2, 6-1, 6-2 and a field magnet 12 and shapes thereof and the region of linear magnetic encoder magnetic poles 63 as to the swing-arm type linear motor 51 shown in FIG. 5. FIG. 8 is a partially cutaway perspective view of the swing-arm type linear motor 51 shown in FIG. 5.

The swing-arm type linear motor 51 equipped with a linear magnetic encoder according to this embodiment is different from the linear motor 1 in that the linear magnetic encoder magnetic poles 63 formed on a region of a surface, which is on the same plane as that formed with the field magnet 12, but is not formed with the field magnet 12, of a magnet member 11, and a magnetroresistance element 15 is arranged on an inner top wall of the element 2a, which is opposite to the linear magnetic encoder magnetic poles 63 through an air gap 66, thereby composing the linear magnet encoder. However, since other structures therein are the same as those of the swing-arm type linear motor in the first embodiment, their structures are designated by the same reference characters and their description will be omitted.

In the case of the second embodiment, linear magnetic encoder signals for Z phase can be obtained with ease. Therefore, it is convenient to magnetize with linear magnetic encoder magnetic poles for Z phase in advance and to arrange a magnetroresistance element capable of obtaining linear magnetic encorder signal for Z phase in addition to the linear magnetic encoder signals of A phase and B phase.

Modified Emobodiments

Although the swing-arm type linear motors 1 and 51 having a double-side exciting structure, in which the stator armatures 5A, 6A are arranged on both sides opposite to the field magnet 12, and having a linear magnetic encoder have been described in the above-mentioned embodiments, the linear motors may have a single-side exciting structure wherein any one of the stator armatures 5A and 6A is arranged on only one side.

Although the cases, where the magnetroresitance elements have been used as the magnetic sensors for the linear magnetic encoder, have been described, a Hall element, Hall IC, magnetic head or the like may be used as a magnetic sensor. However, if two magnetic sensors are required in order to obtain magnetic encoder signals of both A phase and B phase, such sensors must be arranged with a phase difference of 90 degrees in terms of electric angle to each other.

Although the most desirable cases, wherein two air-core type armature coils have been arranged adjacently so as not to overlap each other on a plane, have been described in the above embodiments, three or more of armature coils may be used or they may also be arranged so as to overlap each other if the armature coils are arranged so that conductor portions contributing to the generation of reverse thrust are not be positioned where they come to face the field magnet. Alternatively, only one armature coil may be used if desired thrust can be obtained thereby.

The stator armatures composed by the air-core type armature coils, which were formed by winding a wire, have been described. However, those composed by sheet coils, which have been formed by a means such as etching or punching of a conductor, or printed coils, etc. may be used if coreless armatures can be composed thereby.

Furthermore, both field magnet and linear magnetic encoder magnetic poles have been formed on the magnet member in each of the above embodiments. In each case, a yoke material may be interposed between the field magnet and the linear magnetic encoder magnetic poles so that the strong magnetic force of the field magnet does not adversely affect the magnet member. Alternatively, a yoke material may be laminated on a magnet member to be magnetized with a field magnet and a member for forming linear magnetic encoder magnetic poles may be affixed on the yoke material.

ADVANTAGES OF THE INVENTION

The swing-type linear motors according to this invention are coreless type linear d.c. brushless motors. Therefore, they can reciprocally swing smoothly and fast without cogging. When used in a magnetic head positioner, the swing-arm type linear motor allows a magnetic head to move smoothly and fast to a desired position. In addition, it is expected to lengthen their span of life because they have a brushless motor structure.

Moreover, since the swing-arm type linear motors of this invention make effective use of magnet materials whose performance has been increasing of late years in particular, they can generate large thrust though they are relatively small, although their structures become very simple. In addition, the swing-arm type linear motors have an effect that units of good performance can be composed at a low cost and in a small size.

Furthermore, the swing-arm type linear motors have been composed by the magnet member as a swinger, on which the field magnet of a sole magnetic pole structure has been formed, and the air-core type armature coils as stators. They hence have an advantage that it is possible to make their stroke relatively long though they are of small sizes.

In particular, high-powered magnets, such as neodymium-boron-iron type magnets, having a thickness no more than about 1 mm, but possessing high magnetic force have been produced in recent years. The practice of the predetermined magnetization by making use of such a strong magnet material makes the present invention more useful.

By making use of the swing-arm type linear motors having the linear magnetic encoder according to this invention, magnetic head positioner mechanisms can be composed at a low cost and in a small size without provision of a large-size and expensive linear potentiometer or encoder and without sacrificing one of plural magnetic disks to detect the feed ratio and position of the magnetic head.

Having now fully described the invention, it will be apparent to one of ordinary skill in the art that many changes and modifications can be made thereto without departing from the spirit or scope of the invention as set forth herein.

What is claimed is:

1. A swing-arm type linear d.c. brushless motor having a body and comprising:
   at least one coreless type armature coil such as as air-core armature coil arranged on the inner wall of the linear motor body; and
   a field magnet formed by magnetizing a magnet member with a single pair of N/S poles so as to permit the generation of thrust in a predetermined direction face to face with only one active conductor portion of said at least one armature coil and which does not contribute to the generation of reverse thrust, said field magnet being opposite an axial air-gap from said one active conductor portion, and being supported to swing through the air-gap.

2. The swing-arm type linear d.c. brushless motor as claimed in claim 1, wherein said at least one armature coil comprises two air-core type armature coils arranged adjacently so as not to overlap each other at portions thereof opposite the air-gap from the field magnet, thereby obtaining required thrust only by adjacent active conductor portions of the two armature coils and which do not contribute to the generation of reverse thrust, and wherein the width of the magnetic poles of the field magnet is less than the distance between conductor portions located at the outer sides of the two air-core armature coils.

3. The swing-arm type linear d.c. brushless motor as claimed in claim 2, wherein the maximum of the field magnet is almost the same as the width of the armature coil.

4. The swing-arm type linear d.c. brushless motor as claimed in claim 1, wherein the field magnet is formed by mangetizing a portion of a flat magnet member swingably supported, said magnet member portion facing only one active conductor portion not contributing to the generation of reverse thrust.

5. The swing-arm type linear d.c. brusless motor as claimed in claim 4, wherein the magnet member having the field magnet portion is joined with a rotating shaft supported pivotably at a position in a non-magnetized portion of the field magnet.

6. The swing-arm type linear d.c. brushless motor as claimed in claim 5, wherein the non-magnetized portion of the magnet member is extended to form an integral magnetic head attaching part projecting from the swing-arm type linear motor body.

7. The swing-arm type linear d.c. brushless motor as claimed in claim 1, wherein a plurality of fine-pitch magnetic poles are formed at predetermined positions on the magnet member forming the field magnet in such a manner that circumferentially-adjacent magnetic poles are different in pole from one another, so as to form linear magnetic encoder magnetic poles, and including a magnetic sensor adapted to obtain magnetic encoder signals of at least A phase and B phase arranged at a fixed position facing the linear magnetic encoder magnetic poles through a space, whereby a linear magnetic encoder is provided with the linear magnetic encoder magnetic poles and the magnetic sensor.

8. The swing-arm type linear d.c. brushless motor as claimed in claim 7, wherein the linear magnetic encoder magnetic poles are formed on a surface of the magnet member which does not face the armature coil.

9. The swing-arm type linear d.c. brushless motor as claimed in claim 7, wherein the linear magnetic encoder magnetic poles are formed on a surface of the magnet member which is on the same plane as that facing the armature coil, but does not form the field magnet of the magnet member.

* * * * *

UNITED STATES PATENT AND TRADEMARK OFFICE
CERTIFICATE OF CORRECTION

PATENT NO. : 5,038,062
DATED : August 6, 1991
INVENTOR(S) : MANABU SHIRAKI

It is certified that error appears in the above-identified patent and that said Letters Patent is hereby corrected as shown below:

Claim 1, column 8, line 3, change "as as" to --as an--.

Claim 4, column 8, line 32, change "mangetizing" to --magnetizing--.

Claim 5, column 8, line 36, change "brusless" to --brushless--.

Signed and Sealed this

Seventeenth Day of November, 1992

Attest:

DOUGLAS B. COMER

*Attesting Officer*     Acting Commissioner of Patents and Trademarks